United States Patent [19]
Micali

[11] Patent Number: 5,793,868
[45] Date of Patent: Aug. 11, 1998

[54] CERTIFICATE REVOCATION SYSTEM

[76] Inventor: Silvio Micali, 459 Chestnut Hill Ave., Brookline, Mass. 02146

[21] Appl. No.: 746,007
[22] Filed: Nov. 5, 1996

Related U.S. Application Data

[60] Provisional application No. 60/025,128 Aug. 29, 1996.
[63] Continuation-in-part of Ser. No. 715,712, Sep. 19, 1996.
[51] Int. Cl.$^6$ .................................................. H04L 9/28
[52] U.S. Cl. ........................................ 380/28; 380/30
[58] Field of Search ................................ 380/23, 28, 30

[56] References Cited

U.S. PATENT DOCUMENTS

| | | | |
|---|---|---|---|
| Re. 34,954 | 5/1995 | Haber et al. | |
| 4,200,770 | 4/1980 | Hellman et al. | 178/22 |
| 4,218,582 | 8/1980 | Hellman et al. | 178/22 |
| 4,309,569 | 1/1982 | Merkle | 178/22.08 |
| 4,326,098 | 4/1982 | Bouricius et al. | 178/22.08 |
| 4,881,264 | 11/1989 | Merkle | 380/25 |
| 4,926,480 | 5/1990 | Chaum | 380/23 |
| 4,943,707 | 7/1990 | Boggan | 235/380 |
| 5,003,597 | 3/1991 | Merkle | 380/37 |
| 5,016,274 | 5/1991 | Micali et al. | 380/23 |
| 5,136,646 | 8/1992 | Haber et al. | |
| 5,136,647 | 8/1992 | Haber et al. | |
| 5,157,726 | 10/1992 | Merkle et al. | 380/23 |
| 5,231,666 | 7/1993 | Matyas | 380/25 |
| 5,261,002 | 11/1993 | Perlman et al. | 380/30 |
| 5,340,969 | 8/1994 | Cox | 235/381 |
| 5,396,624 | 3/1995 | Campbell, Jr. | 395/600 |
| 5,420,927 | 5/1995 | Micali | 380/23 |
| 5,432,852 | 7/1995 | Leighton et al. | 380/30 |
| 5,440,634 | 8/1995 | Jones et al. | 380/24 |
| 5,450,493 | 9/1995 | Maher | 380/30 |
| 5,537,475 | 7/1996 | Micali | 380/30 |
| 5,544,322 | 8/1996 | Cheng et al. | 395/200.12 |
| 5,606,617 | 2/1997 | Brands | |

OTHER PUBLICATIONS

Elgamal, et al., *Securing Communications on the Intranet and Over the Internet*, Netscape Communications Corporation, Jul. 1996.

Rivest, R.L., et al., "PayWord and MicroMint: Two simple micropayment schemes", *MIT Laboratory for Computer Science/Weizmann Institute of Science*, 11 pgs. (Nov. 1995).

Housley, R., et al. "Internet Public Key Infrastructure Part I: X.509 Certificate and CRL Profile", Published on the World Wide Web, 1–30 (Jun. 1996).

Farrell, S., et al. "Internet Public Key Infrastructure Part III: Certificate Management Protocols", Published on the World Wide Web, 1–36 (Jun. 1996).

"Final Text of Draft Amendments DAM 4 to ISO/IEC 9594-2, DAM 2 to ISO/IEC 9594-6, DAM 1 to ISO/IEC 9594-7, and DAM 1 to ISO/IEC 9594-8 on Certificate Extensions", 41 pages (Jun. 30, 1996).

ANSI X9.55-1955 "Public Key Cryptography for the Financial Services Industry: Extensions to Public Key Certificates and Certificate Revocation Lists" (working draft) 37 pages (Jul. 3, 1996).

ANSI X9.57-199x Public Key: Cryptography for the Financial Services Industry: Certificate Management© (working draft) 86 pages (Jun. 21, 1996).

Bellare, M., et al., "Incremental Cryptography: The Case of Hashing and Signing" *Proceedings of Crypto '95* 216–233 (1995).

(List continued on next page.)

*Primary Examiner*—Gilberto Barrón, Jr.
*Attorney, Agent, or Firm*—Foley, Hoag & Eliot LLP

[57] ABSTRACT

Authenticating information about revoked certificates includes generating data identifying the revoked certificates, generating information about the revoked certificates including the data without including the revocation date of every one of the revoked certificates, and having the authority authenticate the information. The data may be generated by performing a hash of at least a portion of each of the certificates. Generating information about the revoked certificates may include adding a date indicating when the information was authenticated and may exclude the revocation date of any one of the revoked certificates in the list.

74 Claims, 1 Drawing Sheet

OTHER PUBLICATIONS

Micali, S., "Computationally–Sound Proofs", *MIT Laboratory for Computer Science*, 55 pages, Apr. 11, 1995.

Micali, S. et al., Abstract entitled "An Efficient Zero–Knowledge Method for Answering Is He In Or Out? Questions" presented by M. Rabin at the National Computer Science Institute in Berkeley, CA (Dec. 1995).

"Escrowed Encryption Standard (EES)", Federal Information Processing Standards Publication 185, Feb. 9, 1994, 7 pps.

CygnaCom Solutions, Inc., "Federal Public Key Infrastructure (PKI) Technical Specifications Part D —Interoperability Profiles", Published on the World Wide Web, Sep. 27, 1995, 91 pages.

Nazario, N., "Federal Public Key Infrastructure (PKI) Version 1 Technical Specifications: Part B—Technicals ecurity Policy," Published on the World Wide Web, Mar. 13, 1996, 20 pages.

Polk, W., editor, "Federal Public Key Infrastructure (PKI) Technical Specifications (Version 1) Part A: Requirements," Published on the World Wide Web, Dec. 6, 1996, 18 pages.

Ford, Warwick, "A Public Key Infrastructure for U.S. Government Unclassified but Sensitive Applications," Published on the World Wide Web, Sep. 1, 1995, 93 pages.

Chokhani, Santosh, et al., "Certificate Policy and Certification Practice Statement Framework", Published on the World Wide Web, Nov. 3, 1996.

Burr, William E. et al., "A Proposed Federal PKI Using X.509 V3 Certificates," Published on the World Wide Web.

Burr, W.E., "Public Key Infrastructure (PKI) Technical Specifications (Version 1): Part C—Concept of Operations," Published on the World Wide Web, Feb. 12, 1996, 30 pages.

Ford, Warwick, "Public–Key Infrastructure Standards," Published on the World Wide Web, Oct. 1996, 15 printed pages.

Polk, William T., "Minimum Interoperability Specifications for PKI Components," Published on the World Wide Web, Nov. 1996.

Chokhani, Santosh, "Security Considerations in Using X. 509 Certificates," Published on the World Wide Web.

Dodson, Donna F., "NIST PKI Implementation Projects," Published on the World Wide Web.

Burr, William, A Proposed Federal PKI Using X.509 V3 Certificates: The NISSC Presentation, Published on the World Wide Web.

Nazario, Noel et al., "Management Model for the Federal Public Key Infrastructure," Published on the World Wide Web, Oct. 24, 1996.

Nazario, Noel A., "Security Policies for the Federal Public Key Infrastructure," Published on the World Wide Web, Oct. 24, 1996.

Burr, William, et al., "MISPC: Minimum Interoperability Specifications for PKI Components," Published on the World Wide Web, Dec. 2, 1996.

Escrowed Encryption Standard (EES) FIPS Pub. 185, Feb. 9, 1994.

Chaum, D., "Untraceable Electronic Mail, Return Addresses, and Digital Pseudonyms," *Communications of the ACM*, vol. 24, No. 2, Feb. 1981, pp. 84–88.

Gennaro, Rosario et al., "Robust Threshold DSS Signatures," Abstract from *EuroCrypt '96*.

Harn, L., "Group Oriented (t,n) threshold digital signature scheme and digital multisignature," *IEE Proc.—Comput. Digit. Tech.*, vol. 141, No. 5, Sep. 1994, pp. 307–313.

Micali, Silvio, "Enhanced Certificate Revocation System," Technical Report, Nov. 1995.

Rivest, Ronald et al., "SDSI—A Simple Distributed Security Infrastruture," Sep. 15, 1996, Published on the World Wide Web.

Farrell, S., et al., "Internet Public Key Infrastructure Part III: Certificate Management Protocols," Dec. 1996, Published on the World Wide Web, 83 printed pages.

Kent, S., et al., IAB Privacy Task Force, Request for Comments No. 114, "Privacy Enhancement for Internet Electronic Mail: Part II—Certificate–Based Key Management", 1–22 (Aug. 1989).

"Public Key Infrastructure Study—Final Report", *National Institute of Standards and Technology* (Apr. 1994).

International Standard ISO/IEC 9594–8, "Information technology—Open Systems Interconnection—The Directory: Authentication framework", *ISO/IEC*, second edition, Sep. 15, 1995.

Rivest, R.L., et al., "A Method for Obtaining Digital Signatures and Public–Key Cryptosystems", *Communications of the ACM*, 120–126 (Feb. 1978).

Lamport, L., "Password Authentication with Insecure Communication", *Communications of the ACM*, 770–772 (Nov. 1981).

Linn, J., IAB Privacy Task Force, Request for Comments No. 1113, "Privacy Enhancement for Internet Electronic Mail: Part I—Message Encipherment and Authentication Procedures" 1–30 (Aug. 1989).

5,793,868

1

CERTIFICATE REVOCATION SYSTEM

This application is a continuation in part of U.S. patent application Ser. No. 08/715,712 filed on Sep. 19, 1996 pending and is based on U.S. provisional patent application No. 60/025,128 filed on Aug. 29, 1996.

TECHNICAL FIELD

The present invention relates generally to secure communications and more particularly to schemes for certificate management.

BACKGROUND OF THE INVENTION

In many settings, it is useful to certify data, as well as to revoke data that was previously certified. For instance, in a Public Key Infrastructure (PKI), it may be useful to certify users' public keys. Such certification may be provided in the form of a certificate which contains the certified data and vouches authenticity of the certified data.

In a digital signature scheme, each user U chooses a signing key $SK_u$ and a matching verification key, $PK_u$. User U uses $SK_u$ to compute a digital signature of a message m, $SIG_u(m)$, while anyone knowing that $PK_u$ is U's public key can verify that $SIG_u(m)$ is U's signature of m. Finding $SIG_u(m)$ without knowing $SK_u$ is practically impossible. On the other hand, knowledge of $PK_u$ does not give any practical advantage in computing $SK_u$. For this reason, it is in U's interest to keep $SK_u$ secret (so that only he can digitally sign for U) and to make $PK_u$ as public as possible (so that everyone dealing with U can verify U's digital signatures). At the same time, in a world with millions of users, it is essential in the smooth flow of business and communications to be certain that $PK_u$ really is the legitimate key of user U. To this end, users' public keys are often "certified" by a certificate that serves as proof that U is the legitimate owner of $PK_u$. At the same time it is also useful to be able to revoke some of the already-issued certificates when U is no longer the legitimate owner of $PK_u$ (for whatever reason) and/or when $SK_u$ has been compromised. Of course, the need for certification and certificate revocation extends beyond certifying public keys.

In many instances, certificates for users' public keys are produced and revoked by certifying authorities called CA's. A complete public key infrastructure may involved other authorities (e.g., PCAs) who may also provide similar services (e.g., they may certify the public keys of their CA's). The present discussion can be easily applied to such other authorities in a straight-forward manner.

A CA may be a trusted agent having an already certified (or universally known) public key. To certify that $Pk_u$ is U's public key, a CA typically digitally signs $Pk_u$ together with (e.g., concatenating it with) U's name, a certificate serial number, the current date (i.e., the certification or issue date), and an expiration date. The CA's signature of $Pk_u$ is then inserted in a Directory and/or given to U himself. Note that, before certifying U's public key, it is necessary to perform additional steps, such as properly identifying user U. However, these additional steps are optional.

Upon receiving the (alleged) digital signature of user U of a message M, $SIG_u(M)$, a recipient R needs to obtain a certificate for $PK_u$. In fact, $SIG_u(M)$ may be a correct digital signature of M with respect to some public key $PK_u$, but R has no guarantee that $PK_u$ is indeed U's public key. Recipient R may obtain this certificate from the Directory, or from his own memory (if he has previously cached it), or from U himself. Having done this, R verifies (1) the correctness of

2 the CA's certificate for $PK_u$ with respect to the CA's public key, and (2) the correctness of $SIG_u(M)$ with respect to $PK_u$. If the CA's public key is not universally known, or cached with R, then a certificate for the CA's key may also be obtained.

Certificate retrieval is thus possible, although not necessarily cheap. Unfortunately, however, this is not the only retrieval that R needs to do. In addition, it is important that R makes sure that the certificate for $PK_u$ has not been revoked. This check, of course, may not be needed after the certificate's expiration date, but may be needed during the certificate's alleged lifetime. A user's certificate can be revoked for a variety of reasons, including key compromise and the fact that the user is no longer associated with a particular CA.

To enable a recipient to establish whether a given certificate has been revoked, it is known to have each CA periodically issues a Certificate Revocation List (CRL for short). A CRL may consist of the issuer's digital signature of a header comprising the issuer's name (as well as the type of his signature algorithm), the current date, the date of the last update, and the date of the next update, together with complete list of revoked certificates (whose date has not yet expired), each with its serial number and revocation date. Since it is expected that a CA revokes many certificates, a CRL is expected to be quite long. It is envisaged that the CRL is provided to a Directory who may then distribute the CRL to end users.

After performing some checks on the CA's CRL (e.g., checking the CA's digital signature, checking that the CRL has arrived at the expected time, that a certificate declared revoked in the previous CRL of that CA—and not yet expired—still is revoked in the current CRL, etc.), the Directory stores it under the name of the CA.

When a user queries the Directory about the revocation of a certificate issued by a given CA, the Directory responds by sending to the user the latest CRL of that CA. The user can then check the CRL signature, the CRL dates (so as to receive a reasonable assurance that he is dealing with the latest one), and whether or not the certificate of interest to him belongs to it.

While CRLs are quite effective in helping users establishing which certificates are no longer deemed valid, they are also extremely expensive, because they tend to be very long and need to be transmitted very often.

The National Institute of Standard and Technology has tasked the MITRE Corporation to study the organization and cost of a Public Key Infrastructure (PKI) for the Federal Government. This study estimates that CRLs constitute by far the largest entry in the Federal PKI's cost list. According to MITRE's estimates/assumptions, in the Federal PKI there are about three million users, each CA serves 30,000 users. 10% of the certificates are revoked (5% because of key compromise and 5% because of change in affiliation with the organization connected to a given CA). CRLs are sent out bi-weekly, and the recipient of a digital signature requests certificate information 20% of the time (assuming that the remaining 80% of the time he will be dealing with public keys in his cache). The study envisages that each revoked certificate is specified in a CRL by means of about 9 bytes: 20 bits of serial number and 48 bits of revocation date. Thus, in the Federal PKI, each CRL is expected to comprise thousands of certificate serial numbers and their revocation dates; the header, however, has a fixed length, consisting of just 51 bytes.

At two cents per kilobyte, the impact of CRL transmission on the estimated yearly costs of running the Federal PKI is stunning: if each federal employee verifies one hundred digital signatures per day on average, then the total PKI yearly costs are $10,848 million of which $10,237 million is due to CRL transmission. If each employee is assumed to verify just five digital signatures a day on average, then the total PKI yearly costs are $732 million, of which 563 million is due to CRL transmission.

The MITRE study thus suggests that any effort should be made to find designs alternative to and cheaper than conventional CRL's.

SUMMARY OF THE INVENTION

According to the present invention, authenticating information about revoked certificates includes generating data identifying the revoked certificates, generating information about the revoked certificates including the data without including the revocation date of every one of the revoked certificates, and having the authority authenticate the information. The data may be generated by performing a hash of at least a portion of each of the certificates. The information generated about the revoked certificates may include the data without including the revocation date of at least half of the revoked certificates. Generating information about the revoked certificates may include adding a date indicating when the information was authenticated and may exclude the revocation date of any one of the revoked certificates in the list.

Generating the data may include specifying certificate serial numbers of the revoked certificates. It is also possible to map a revoked certificate to one or more bit positions in the data and to have values at the one or more bit positions convey information about the certificate. The data may be obtained by compressing a list of identifiers of the revoked certificates. Each revoked certificate may have a serial number and generating the data may produce less bits than a summation of all the bits of the serial numbers of the revoked certificates.

It is possible to map a revoked certificate to one or more bit positions in the data and to have values at the one or more bit positions convey information about the certificate. Authenticating the information may include digitally signing at least one of: the information alone, the information together with date information, and the information together with additional data.

According further to the present invention, an authority provides authenticated information about revoked certificates by generating minimal data identifying the revoked certificates, generating information about the revoked certificates only by adding to the data one or more additional items that are shared by all the revoked certificates, and by having the authority authenticate the information.

According further to the present invention, an authority provides authenticated information about revoked certificates by generating minimal data identifying the revoked certificates, generating information about the revoked certificates by only adding to the data one or more additional items that are shared by two or more of the revoked certificates, and by having the authority authenticate the information.

According further to the present invention, an authority provides authenticated information about revoked certificates by generating minimal data identifying the revoked certificates, generating information about the revoked certificates by adding to the data one or more first items that are shared among certificates of a proper subset of the revoked certificates and one or more second items that are shared among all the revoked certificates, and by having the authority authenticate the information.

According further to the present invention, an authority provides authenticated information about whether certificates have been revoked by generating a data string in which each of the certificates corresponds to a single bit of the data string and the value of each of the bits indicates whether a corresponding one of the certificates has been revoked and by having the authority authenticate the data string.

According further to the present invention, an authority provides authenticated information about whether certificates have been revoked by mapping at least one of the certificates to one or more bit positions in a data string and having values at the one or more bit positions convey information about whether the at least one of the certificates has been revoked and by having the authority authenticate the data string.

According further to the present invention, an authority provides authenticated data about certificates by mapping at least one of the certificates to one or more bit positions in a data string and having values at the one or more bit positions convey information about the at least one certificate and by having the authority authenticate the data string. The certificates may be public key certificates. Authenticating the data string may include digitally signing at least one of: the data string alone, the data string together with date information, and the data string together with additional data. The mapping may include mapping each of the certificates according to the serial numbers of the certificates.

According further to the present invention, an authority generates authenticated information about revoked certificates by generating data identifying the revoked certificates, generating compressed date information indicating a date of revocation for each of a first subgroup of the revoked certificates that contains at least one of the revoked certificates, and by generating the authenticated information by authenticating at least one of: the data together with the compressed date information alone, the data together with compressed date information and other date information, and the date together with the compressed date information and other information. The other date information may include revocation dates of the revoked certificates that are outside of the first subgroup. Generating compressed date information may include specifying a number of days between a revocation date and a reference date, which may be the date of issuance of the certificate or may be the date of authentication. The first subgroup may contain all of the revoked certificates.

According further to the present invention, an intermediary proves certificate information to a user by causing the user to receive authenticated certificate information that is provided by one or more of the techniques set forth above. The intermediary may provide the authenticated information directly to the user. The intermediary may receive the authenticated information from at least one of: the authority, an other intermediary, and a user.

According further to the present invention, a user uses authenticated certificate information that is generated by one or more of the techniques set forth above. The user may receive the authenticated information from at least one of: an authority, an intermediary, and an other user.

BRIEF DESCRIPTION OF DRAWINGS

The sole FIGURE illustrates generating CRLs according to the present invention.

DETAILED DESCRIPTION OF THE PREFERRED EMBODIMENTS

Figure 1:
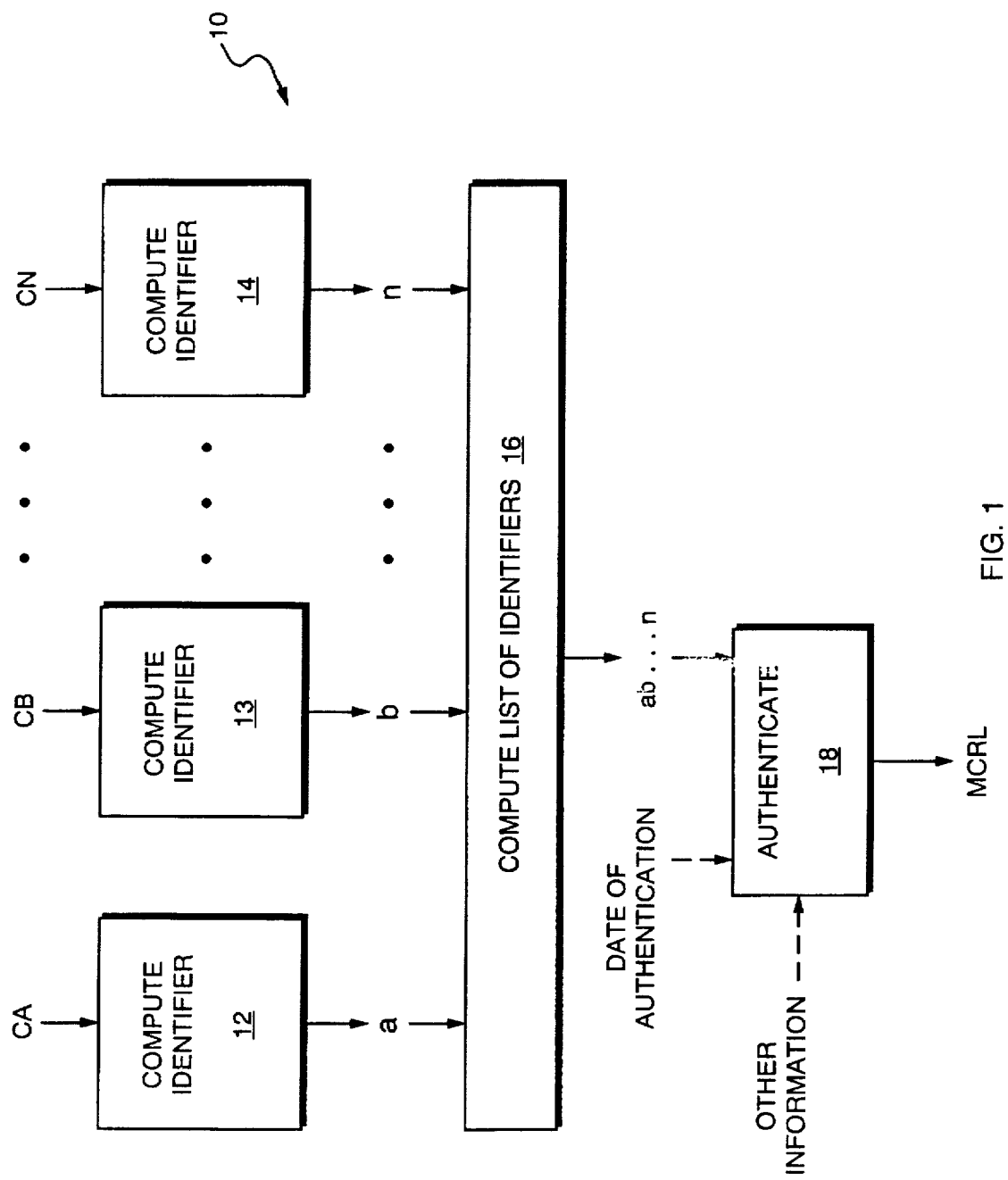

The transmission and storage costs of CRLs may be minimized by means of a structure called a Minimal CRL.

or MCRL for short. As discussed below, an MCRL provides alternative and preferable encodings of information contained in a conventional CRL (such as the CRL described in the MITRE study, discussed above), as well as providing a suitable subset of this information. Also, as discussed below, the MCRL may be used in conjunction with other certificate management techniques so as to yield a more complete certificate revocation system.

In certificate management, it is useful to enable users to determine which certificates are valid and which certificates are revoked. For certificates that are valid, often no additional information is needed. When a certificate has been revoked, however, it is sometimes useful to obtain additional information. In particular, it is sometimes useful to obtain the revocation date, the reasons for revocation, etc. Note that a conventional CRL is inefficient because a conventional CRL provides both validity and revocation information simultaneously, even though a user may only want or need one or the other. But just in case the user needs certificate information, a conventional CRL contains at some additional information about the revoked certificate. Indeed, a conventional CRL contains serial numbers and revocation dates for all revoked certificates.

Assume now that a user wishes to know whether a given certificate (of a given CA) is revoked. Then, if the certificate is valid, the user can verify this by inspecting the CRL and realizing that the serial number of the certificate in question is not in the CRL. However, this verification occurs at a great expense because in order verify that a given certificate is not revoked, the user must process plenty of excessive information (e.g., all the revocation dates of all the revoked certificates) in order to verify the CA's digital signature of the entire CRL. If, instead, the certificate has been revoked, then a user can verify that this is the case and can learn the revocation date of the certificate. However, in this case, the user may wish to learn additional information about the revoked certificate that is not part of the CRL. Although one could store in a conventional CRL all kinds of other additional information about the revoked certificates, this could make a conventional CRL even more inefficient. These difficulties occur because a conventional CRL is used to prove both revocation and non-revocation. Thus, in some cases a conventional CRL contains excessive information and, in other cases, contains too little information.

Thus, it may be useful to have a certificate management system that organizes information so as to prove without excessive information which certificates are not revoked while proving any amount of additional information about a given revoked certificate. The system disclosed herein treats validity information differently than revocation information so as to obtain greater efficiency (in storage, transmission, cost, etc.).

When revoking a certificate, the CA may also issue revocation information for the particular certificate. This revocation information could be as informative as desired. For instance, the CA may authenticate (e.g., digitally sign) the certificate serial number, the revocation date, the reason for revocation, and other information (e.g., the issuer, signing algorithm used, etc.).

The CA, however, also periodically issues an MCRL by compiling a list of serial numbers of all revoked certificates without including any of the other information (such as revocation dates), by appending the current date (and possibly additional information) to the list, and authenticating (e.g., digitally signing) the resulting list. In general, an MCRL may contain a header information with data items such as the date of issuance of the MCRL, the issuer of the MCRL, the authentication procedure used for the MCRL, etc. If directories are used, the CA may send the revocation information for each of the individual certificates and (periodically) an MCRL to the Directory.

Referring to the sole FIGURE, a block diagram 10 illustrates generation of an MCRL. The revoked certificates (CA, CB, . . . CN) are provided to a plurality of blocks 12–14, wherein each of the blocks 12–14 computes an identifier for the certificate input thereto. As described in more detail elsewhere herein, the identifiers (a, b, . . . n) may be the serial numbers of the certificates, compressed versions of serial numbers of the certificates, bits in a string, or any other one of a variety of representations for identifying the underlying certificates.

The identifiers are provided to a block 16 that computes a list of identifiers, ab . . . n, that is then provided to another block 18 which authenticates the list to provide an MCRL. As discussed elsewhere herein, it is possible for the MCRL to also contain an authenticated version of the date of authentication and/or authenticated other information. Accordingly, the date of authentication and the other information are shown as optional inputs to the block 18.

When the Directory receives a user query about a given certificate of the CA, the Directory performs one of the following two steps: (1) if the certificate is revoked, it retrieves and sends the querying user the corresponding revocation information that was issued by the CA; or (2) if the certificate has not been revoked, the directory retrieves and sends the user the latest MCRL which, as discussed above, is authenticated (e.g., digitally signed) by the CA. Step (1) proves to the user that the certificate is revoked. Step (2) proves that the certificate has not been revoked (at least up to the date of issuance of the MCRL). Indeed, the MCRL contains a list of serial numbers of all revoked certificates. Therefore, if the serial number of the certificate in question does not appear in the MCRL (which is properly authenticated by the CA), the user is assured that the certificate in question is not revoked.

The storage savings realized by this can be illustrated as follows: Assuming that a conventional CRL has serial number that is twenty bits long and a revocation date that is forty-eight bits long (as disclosed in the MITRE study), then the MCRL discussed above is roughly three times shorter than the conventional CRL. Indeed, for each revoked certificate, an MCRL uses twenty bits while a conventional CRL uses sixty-eight bits.

At the same time, however, notice too that the system discussed above is at least as informative as a system that uses a conventional CRL. In fact, if a query is made about a certificate that has been revoked, then the Directory answers the query by possibly providing even more information than a conventional CRL, since an individual certificate revocation may indicate the revocation date together with other useful data. Conversely, if a certificate is still valid at the date that the MCRL is constructed, then the MCRL proves that fact more succinctly since a conventional CRL proves the same validity, but also provides plenty of non-essential information, such as the revocation dates of certificates that are not in question. The system discussed above is thus quite effective in answering queries about individual certificates.

As seen above, an MCRL may consist of authenticated data including (possibly) a header and minimal data indicating a given group of revoked certificates. (Unauthenticated) data indicating a given group of revoked certificate is not considered minimal if removal of a portion of that data still indicates that the same group of revoked certificates.

Other enhancements may be obtained by identifying the revoked certificates in a different manner. For instance, assume that up to a particular date the CA has issued 30,000 certificates. Then, the CA may generate an MCRL by authenticating (e.g., digitally signing) the current date together with a 30,000 bit string S (and possibly other information). The string S may be determined by having the ith bit of S be one if the certificate with serial number i is revoked and having the ith bit be zero otherwise. As before, a query about a revoked certificate may be answered by the corresponding (and quite informative) revocation certificate for the certificate in question, while a query about a non-revoked certificate may be answered with the corresponding MCRL containing the string S. Such an MCRL provides adequate information because verifying that a particular certificate is not revoked does not require receiving the revocation dates of other revoked certificates provided in a conventional CRL.

Such an MCRL is also quite efficient because a 30,000 bit string is much shorter than the corresponding conventional CRL. In fact, assuming (like in the MITRE study discussed above) that the revocation rate (i.e., the fraction of issued certificates that are revoked) is 10%, then each revoked certificate "occupies" ten MCRL bits of the string S. In contrast, each of the revoked certificates in a conventional CRL uses sixty-eight bits. Thus, this MCRL is roughly six times shorter than a conventional CRL.

Note that the string S is obtained by mapping each certificate to a single bit location of the string S so that the value of the bit at such a location conveys information about the certificate itself. The information indicates whether the certificate is revoked or valid and is authenticated because the entire string S is authenticated. This system may be generalized by mapping each certificate in a group of certificates to one or more bit locations of a data string and by having the values of the bits at the locations convey any type of information about the certificate. Thus, both the locations and the bit values contribute to specify authenticated information about certificates. Of course, this system needs not to be used for all certificates. In fact, it may be advantageously used for a subset of certificates or even for a single certificate.

Note that, in the example given above, the string S is a very special string. In fact, only one in ten of the bits of S is a one. Therefore, one could apply various data compression techniques to make S, and thus the MCRL, even shorter.

Data compression techniques can also be applied to other ways of identifying the revoked certificates, such as by having every MCRL encode the difference between the serial number of one revoked certificate and the serial number of the next revoked certificate. For instance, assume that zero stands for the serial number of the "first" revoked certificate. Let i be the serial number of actual first revoked certificate, j be the serial number of the actual second revoked certificate, etc. Then, the data string encoding the serial numbers of the revoked certificates may consist of the number i, followed by the number j–i, etc. In particular, the values i,j–i, etc., may be encoded as follows: 00 encodes 0, 01 encodes 1, 10 encodes 2, and 11 encodes END. Then an encoding of value i may consist of a ternary representation of i followed by the end pattern 11; then a ternary representation of j–i followed by 11; and so on until there are serial numbers of revoked certificates to be represented in the MCRL.

It should be realized that such encoding are just representative ones, and that, depending on the revocation rate, number of revoked certificates, or other functional factors familiar to one of ordinary skill in the art, other data compression schemes may be chosen.

Alternatively still, it is possible to provide compact structures for conveying certificate revocation information that are more efficient than conventional CRLs even while retaining revocation date information (or other information). Assuming that there are going to be several certificates that have been revoked on the same date, then an MCRL may be constructed by having a data item identifying a revocation date be shared by more than one revoked certificate. For instance, it is possible to construct such an MCRL by specifying a first revocation date followed by all the serial numbers of the revoked certificates that share that revocation date, a second revocation date followed by the serial numbers of the revoked certificates that share the second date, and so on. Alternatively yet, a data item such as a revocation date could be shared by writing the data item in a particular location of a data string once and then providing each of the entries corresponding to revoked certificates in the MCRL with a pointer to the location where the data is written. The pointer may be encoded in a way that uses less bits than the data item pointed to by the pointer. For instance, if the MCRL data string is 200,000 bits long, a pointer to a particular bit would require a pointer of at most sixteen bits, which is shorter than the forty-eight bits suggested for use in representing a date of revocation. Furthermore, it is possible to point to a byte rather than a bit, thus requiring even shorter pointers. In cases of sharing data items in this manner, the pointer and the data item to which the pointer points may be considered shared data items. Items in the header may be considered items that are shared by all of the entries in the MCRL. The use of shared data items may be applied to items of information other than revocation dates so as to provide shorter and more preferable structures. Indeed, a data item may be shared not only by all the entries in the MCRL, but by any proper subset of the entries. By definition, a proper subset of a given set is any subset of the set other the empty subset and the set itself.

It is possible to construct other types of MCRLs that use less bits than conventional CRLs. For instance, in a conventional CRL, the record for each serial number corresponding to a revoked certificate includes a corresponding revocation date (month, day, year). Given that a revocation date can consist of six characters (two each for the month, day, and year), and given that each ASCII character has eight bits, it has been suggested (in the MITRE study, for example) to use forty-eight bits (eight×six) to represent each date of revocation for each revoked certificate. Such a forty-eight bit revocation date for each certificate incurs much of the storage for a conventional CRL when the only other item stored for each revoked certificate is a twenty bit serial number.

However, notice that month information is a number between one and twelve and thus may be represented by a four bit string (possibly with leading zeros). Similarly, day information is a number between one and thirty-one and thus representable with a five-bit string (possibly with leading zeros). As for the year, eleven bits should be sufficient for the foreseeable future (i.e., into the year 2048). Also, it is possible to encode the year by using a value indicating the number of years beyond a particular date. For example, if the particular date is 1975 (e.g., because no certificates were issued or revoked prior to that date), then the year 1996 may be represented by the number twenty-one (i.e., number of years after 1975). In such a case, seven bits encodes years up through the year 2103 (i.e., 1975+2⁷). Note that any encoding of the date of revocation that is less than the conventional forty-eight bits may be considered a compressed date.

Thus, it is possible to encode a full revocation date by using twenty bits (in the case of encoding the year using eleven bits) or sixteen bits (in the case of encoding the year using seven bits). In either case, the result uses less than half of the previously suggested forty-eight bits. Even if one used bytes, then two or three bytes would be sufficient. In addition, if leading zeros are used as necessary, a date so represented does not cause ambiguity since one would know that out of the twenty or sixteen bits, the first four represent the month, the next five represent the day, and so on. Of course, this merely an example and other encodings using less than 48 bits for the date can be devised.

Different and preferable algorithmic representations of revocation dates are also possible. For instance, assume that a certificate is valid for, at most, a year after issuance. Then, the revocation date can be represented by the number of days elapsed since issuance date of the certificate, which can be a field stored in the certificate itself. Therefore, a revocation date would be a number between one and 366 and may be encoded using nine bits. In addition, if it is only necessary to know the revocation date within a certain number of days, then further bit savings may be achieved. For instance, in the example given above, it is possible to store a number representing approximately one half of the number of elapsed days since a certificate has been revoked so that, for example, the storing the number fifty indicates that the certificate was revoked either one hundred or one hundred and one days ago. In that case, the numbers stored would be between zero and one hundred and eighty-six, an eight-bit, one-byte value.

Of course, this encoding may be generalized. For instance, if a certificate is valid for at most two years, then the revocation date could be represented by a number between one and 731, and thus representable by ten bits. Alternatively, it is possible to indicate the revocation date by the number of days before or after a given reference date. For instance, if the reference date is the issuance date of the MCRL, it is possible to indicate the number of days between the revocation date and such a date of issuance. If the reference date is chosen so that the number of days a revocation date and a reference date may be negative as well as positive, then a single bit could indicate whether the number of days between the reference date and the revocation date is negative or positive. A possible way to obtain a reference date is for a CA to sign the reference date within the MCRL.

It will be appreciated by one of ordinary skill in the art that while the MCRL systems described herein are may be effectively used in conjunction with indivudual certificate revocation information, the MCRLs may also be used by themselves. In addition, rather than using MCRLs in conjunction with individual certificate revocation information, it is possible MCRLs in conjunction with authenticated multi-certificate revocation information. For instance, a CA may issue a properly dated and authenticated data string indicating the serial numbers, the revocation dates, and the reasons for revocation of two or more revoked certificates (possibly certifying a different amount of information for different certificates).

It will be appreciated by one of ordinary skill in the art that the system described herein may be applied to public key certificates as well as any other types of certificates that may be revoked. Also, a CA could be any authority. In particular, it is not necessary that such an authority be the authority that issued the certificates being revoked.

It will also be appreciated by one of ordinary skill in the art that the system described herein may not only be applied by an authority for reducing the number of bits used to convey revocation information, but also by an intermediary, such as a directory. Note that an intermediary includes a directory, an other use, an authority, or any entity that causes information to be provided to another entity. Indeed, such an intermediary may receive MCRL information and send that information to other users. More generally, the intermediary may simply cause a user to receive an MCRL from another entity, such as another user, an other directory, an other intermediary, an other CA, and so forth. Similarly, the system disclosed herein may be used advantageously by users to receive information about revoked certificates or valid certificates.

It will be appreciated by one of ordinary skill in the art that although the system has been illustrated herein using serial numbers to identify certificates, it is straight-forward to practice the system by using identifiers, other than serial numbers. Such identifiers include a hash (such as a one-way hash) of at least a portion of a certificate or other convention or unconventional ways for identifying a certificate. In particular, a certificate identifier may include the name of the user about which the certificate has been issued (e.g., the owner of a public key in the case of a public key certificate).

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for an authority to provide authenticated information about revoked certificates, comprising the steps of:

(a) generating data identifying the revoked certificates;

(b) generating information about the revoked certificates including the data without including the revocation date of every one of the revoked certificates, wherein the information is independent of issue dates of the revoked certificates; and (c) having the authority authenticate the information.

2. A method according to claim 1, further comprising the step of:

(d) generating the data by performing a hash of at least a portion of each of the certificates.

3. A method according to claim 1, wherein the information generated about the revoked certificates includes the data without including the revocation date of at least half of the revoked certificates.

4. A method according to claim 1, wherein generating information about the revoked certificates includes adding a date indicating when the information was authenticated.

5. A method according to claim 4, wherein the information generated about the revoked certificates includes the data without including the revocation date of any one of the revoked certificates in the list.

6. A method according to claim 1, wherein generating the data includes specifying certificate serial numbers of the revoked certificates.

7. A method according to claim 6, further comprising the steps of:

(d) mapping a revoked certificate to one or more bit positions in the data and having values at the one or more bit positions convey information about the certificate.

8. A method according to claim 1, wherein the data is obtained by compressing a list of identifiers of the revoked certificates.

9. A method according to claim 8, wherein each revoked certificate has a serial number and generating the data produces less bits than a summation of all the bits of the serial numbers of the revoked certificates.

10. A method according to claim 1, further comprising the steps of:

(d) mapping a revoked certificate to one or more bit positions in the data and having values at the one or more bit positions convey information about the certificate.

11. A method according to claim 1, wherein the step of authenticating the information includes digitally signing at least one of: the information alone, the information together with date information, and the information together with additional data.

12. A method for an authority to provide authenticated information about revoked certificates, comprising the steps of:

(a) generating minimal data identifying the revoked certificates;

(b) generating information about the revoked certificates only by adding to the data one or more additional items that are shared by all the revoked certificates, wherein the information is independent of issue dates of the revoked certificates; and (c) having the authority authenticate the information.

13. A method according to claim 12, wherein generating the data includes specifying certificate serial numbers of the revoked certificates.

14. A method according to claim 13, further comprising the steps of:

(d) mapping a revoked certificate to one or more bit positions in the data and having values at the one or more bit positions convey information about the certificate.

15. A method according to claim 12, wherein the data is obtained by compressing a list of identifiers of the revoked certificates.

16. A method according to claim 12, wherein each revoked certificate has a serial number and generating the data produces less bits than a summation of all the bits of the serial numbers of the revoked certificates.

17. A method according to claim 12, further comprising the steps of:

(d) mapping a revoked certificate to one or more bit positions in the data and having values at the one or more bit positions convey information about the certificate.

18. A method according to claim 12, wherein authenticating the information includes digitally signing at least one of: the information alone, the information together with date information, and the information together with additional data.

19. A method for an authority to provide authenticated information about revoked certificates, comprising the steps of:

(a) generating minimal data identifying the revoked certificates;

(b) generating information about the revoked certificates by only adding to the data one or more additional items that are shared by two or more of the revoked certificates, wherein the information is independent of issue dates of the revoked certificates; and (c) having the authority authenticate the information.

20. A method according to claim 19, wherein generating the data includes specifying certificate serial numbers of the revoked certificates.

21. A method according to claim 20, further comprising the steps of:

(d) mapping a revoked certificate to one or more bit positions in the data and having values at the one or more bit positions convey information about the certificate.

22. A method according to claim 19, wherein the data is obtained by compressing a list of identifiers of the revoked certificates.

23. A method according to claim 22, wherein each revoked certificate has a serial number and generating the data produces less bits than a summation of all the bits of the serial numbers of the revoked certificates.

24. A method according to claim 19, further comprising the steps of:

(d) mapping a revoked certificate to one or more bit positions in the data and having values at the one or more bit positions convey information about the certificate.

25. A method according to claim 19, wherein authenticating the information includes digitally signing at least one of: the information alone, the information together with date information, and the information together with additional data.

26. A method for an authority to provide authenticated information about revoked certificates, comprising the steps of:

(a) generating minimal data identifying the revoked certificates;

(b) generating information about the revoked certificates by adding to the data one or more first items that are shared among certificates of a proper subset of the revoked certificates and one or more second items that are shared among all the revoked certificates; and (c) having the authority authenticate the information.

27. A method according to claim 26, wherein generating the data includes specifying certificate serial numbers of the revoked certificates.

28. A method according to claim 27, further comprising the steps of:

(d) mapping at least one of the serial numbers to one or more bit positions in the data and having values at the one or more bit positions convey information about one of the revoked certificates corresponding to the at least one serial number.

29. A method according to claim 26, wherein the data is obtained by compressing a list of identifiers of the revoked certificates.

30. A method according to claim 29, wherein each revoked certificate has a serial number and generating the data produces less bits than a summation of all the bits of the serial numbers of the revoked certificates.

31. A method according to claim 26, further comprising the steps of:

(d) mapping a revoked certificate to one or more bit positions in the data and having values at the one or more bit positions convey information about the revoked certificate.

32. A method according to claim 26, wherein the step of authenticating the information includes digitally signing at least one of: the information alone, the information together with date information, and the information together with additional data.

33. A method according to claim 32, wherein the date information indicates when the information was authenticated.

34. A method for an authority to provide authenticated information about whether certificates have been revoked, comprising the steps of:

(a) generating a data string, wherein each of the certificates corresponds to a single bit of the data string and the value thereof indicates whether a corresponding one of the certificates has been revoked, wherein information contained in the data string is independent of issue dates of the certificates; and (b) having the authority authenticate the data string.

35. A method according to claim 34, wherein the step of having the authority authenticate the data string includes having the authority authenticate at least one of: the data string alone, the data string together with date information, the data string together with additional information.

36. A method according to claim 35, wherein authenticating the data string includes digitally signing the data string.

37. A method according to claim 36, wherein the date information indicates the date of authentication.

38. A method for an authority to provide authenticated information about whether certificates have been revoked, comprising the steps of:

(a) mapping at least one of the certificates to one or more bit positions in a data string and having values at the one or more bit positions convey information about whether the at least one of the certificates has been revoked, wherein information contained in the data string is independent of issue dates of the certificates; and (b) having the authority authenticate the data string.

39. A method according to claim 38, wherein the step of having the authority authenticate the data string includes having the authority digitally sign at least one of: the data string alone, the data string together with date information, the data string together with additional information.

40. A method for an authority to provide authenticated data about public key certificates, comprising the steps of:

(a) mapping at least one of the public key certificates to one or more bit positions in a data string and having values at the one or more bit positions convey information about the at least one certificate, wherein the information is independent of issue dates of the certificates; and (b) having the authority authenticate the data string.

41. A method according to claim 40, wherein the step of authenticating the data string includes digitally signing at least one of: the data string alone, the data string together with date information, and the data string together with additional data.

42. A method for an authority to provide authenticated data about certificates, comprising the steps of:

(a) mapping each of the certificates to one or more bit positions in a data string and having values at the one or more bit positions convey information about the certificate, wherein the information is independent of issue dates of the certificates; and (b) having the authority authenticate the data string.

43. A method according to claim 42, wherein the step of authenticating the data string includes digitally signing at least one of: the data string alone, the data string together with date information, and the data string together with additional data.

44. A method according to claim 42, wherein mapping includes mapping each of the certificates according to the serial numbers thereof.

45. A method for an authority to generate authenticated information about revoked certificates, comprising the steps of:

(a) generating data identifying the revoked certificates;

(b) generating compressed date information indicating a date of revocation for each of a first subgroup of the revoked certificates that contains at least one of the revoked certificates, wherein the compressed date information is independent of issue dates of certificates that are not revoked; and (c) generating the authenticated information by authenticating at least one of: the data together with the compressed date information alone, the data together with compressed date information and other date information, and the date together with the compressed date information and other information.

46. A method according to claim 45, further comprising the step of:

(d) having the other date information include revocation dates of the revoked certificates that are outside of the first subgroup.

47. A method according to claim 45, wherein generating compressed date information includes specify a number of days between a revocation date and a reference date of at least one of the revoked certificates.

48. A method according to claim 47, wherein the reference date is the date of issuance of the certificate.

49. A method according to claim 47, wherein the reference date is the date of authentication.

50. A method according to claim 45, wherein the first subgroup contains all of the revoked certificates.

51. A method for an intermediary to prove whether a certificate has been revoked, comprising the steps of:

(a) causing a user to receive authenticated information generated by an authority wherein the authority has generated the authenticated information by the steps of:

(a) generating data identifying the revoked certificates;

(b) generating information about the revoked certificates including the data without including the revocation date of every one of the revoked certificates, wherein the information is independent of issue dates of the revoked certificates; and (c) authenticating the information.

52. A method according to claim 51, further comprising the step of:

(b) the intermediary providing the authenticated information directly to the user.

53. A method according to claim 51, further comprising the step of:

(b) the intermediary receiving the authenticated information from at least one of: the authority, an other intermediary, and a user.

54. A method for an intermediary to prove whether a certificate has been revoked, comprising the steps of:

(a) causing a user to receive authenticated information generated by an authority wherein the authority has generated the authenticated information by the steps of:

(a) generating minimal data identifying revoked certificates;

(b) generating information about the revoked certificates only by adding to the data one or more additional items that are shared by all the revoked certificates, wherein the information is independent of issue dates of the revoked certificates; and (c) having the authority authenticate the information.

55. A method according to claim 54, further comprising the step of:

(b) the intermediary providing the authenticated information directly to the user.

56. A method according to claim 54, further comprising the step of:

(b) the intermediary receiving the authenticated information from at least one of: the authority, an other intermediary, and a user.

57. A method for an intermediary to prove whether a certificate has been revoked, comprising the steps of:
  (a) causing a user to receive authenticated information generated by an authority wherein the authority has generated the authenticated information by the steps of:
    (a) generating minimal data identifying revoked certificates;
    (b) generating information about the revoked certificates by only adding to the data one or more additional items that are shared by two or more of the revoked certificates, wherein the information is independent of issue dates of the revoked certificates; and
  (c) having the authority authenticate the information.

58. A method according to claim 57, further comprising the step of:
  (b) the intermediary providing the authenticated information directly to the user.

59. A method according to claim 57, further comprising the step of:
  (b) the intermediary receiving the authenticated information from at least one of: the authority, an other intermediary, and a user.

60. A method for an intermediary to prove whether a certificate has been revoked, comprising the steps of:
  (a) causing a user to receive authenticated information generated by an authority wherein the authority has generated the authenticated information by the steps of:
    (a) generating minimal data identifying revoked certificates;
    (b) generating information about the revoked certificates by adding to the data one or more first items that are shared among certificates of a proper subset of the revoked certificates and one or more second items that are shared among all the revoked certificates, wherein the information is independent of issue dates of the revoked certificates; and
  (c) having the authority authenticate the information.

61. A method according to claim 60, further comprising the step of:
  (b) the intermediary providing the authenticated information directly to the user.

62. A method according to claim 60, further comprising the step of:
  (b) the intermediary receiving the authenticated information from at least one of: the authority, an other intermediary, and a user.

63. A method for an intermediary to prove whether a certificate has been revoked, comprising the steps of:
  (a) causing a user to receive an authenticated data string generated by an authority wherein the authority has generated the authenticated data string by the steps of:
    (a) mapping at least one of the certificates to one or more bit positions in a data string and having values at the one or more bit positions convey information about whether the at least one of the certificates has been revoked, wherein the information is independent of issue dates of the revoked certificates; and
  (b) having the authority authenticate the data string.

64. A method according to claim 63, further comprising the step of:
  (b) the intermediary providing the authenticated information directly to the user.

65. A method according to claim 63, further comprising the step of:
  (b) the intermediary receiving the authenticated information from at least one of: the authority, an other intermediary, and a user.

66. A method for an intermediary to prove information about public key certificates, comprising the steps of:
  (a) causing a user to receive an authenticated data string generated by an authority wherein the authority has generated the authenticated data string by the steps of:
    (a) mapping at least one of the public key certificates to one or more bit positions in a data string and having values at the one or more bit positions convey information about the at least one certificate, wherein the information is independent of issue dates of the public key certificates; and
  (b) having the authority authenticate the data string.

67. A method according to claim 66, further comprising the step of:
  (b) the intermediary providing the authenticated information directly to the user.

68. A method according to claim 66, further comprising the step of:
  (b) the intermediary receiving the authenticated information from at least one of: the authority, an other intermediary, and a user.

69. A method for an intermediary to prove information about certificates, comprising the steps of:
  (a) causing a user to receive authenticated data generated by an authority wherein the authority has generated the authenticated data by the steps of:
    (a) mapping each of the certificates to one or more bit positions in a data string and having values at the one or more bit positions convey information about the certificate, wherein information contained in the data string is independent of issue dates of the certificates; and
  (b) having the authority authenticate the data string.

70. A method according to claim 69, further comprising the step of:
  (b) the intermediary providing the authenticated information directly to the user.

71. A method according to claim 69, further comprising the step of:
  (b) the intermediary receiving the authenticated information from at least one of: the authority, an other intermediary, and a user.

72. A method for an intermediary to prove whether a certificate has been revoked, comprising the steps of:
  (a) causing a user to receive authenticated information generated by an authority wherein the authority has generated the authenticated information by the steps of:
    (a) generating data identifying the revoked certificates;
    (b) generating compressed date information indicating a date of revocation for each of a first subgroup of the revoked certificates that contains at least one of the revoked certificates, wherein the compressed date information is independent of issue dates of the revoked certificates; and
    (c) generating the authenticated information by authenticating at least one of: the data together with the compressed date information alone, the data together with compressed date information and other date information, and the date together with the compressed date information and other information.

73. A method according to claim 72, further comprising the step of:
  (b) the intermediary providing the authenticated information directly to the user.

74. A method according to claim 72, further comprising the step of:
  (b) the intermediary receiving the authenticated information from at least one of: the authority, an other intermediary, and a user.

* * * * *